United States Patent
Douglas et al.

(10) Patent No.: US 9,622,616 B1
(45) Date of Patent: Apr. 18, 2017

(54) DESCALING POD FOR BREWING MACHINE

(71) Applicant: ECO 2, LLC, New Canaan, CT (US)

(72) Inventors: Shaun Douglas, New Canaan, CT (US); Jules Aspesi, New Canaan, CT (US); Tom Jerige, Norwalk, CT (US); Ed Douglas, New Canaan, CT (US)

(*) Notice: Subject to any disclaimer, the term of this patent is extended or adjusted under 35 U.S.C. 154(b) by 0 days.

(21) Appl. No.: 15/085,617

(22) Filed: Mar. 30, 2016

(51) Int. Cl.
*A47J 31/60* (2006.01)
*B08B 3/08* (2006.01)

(52) U.S. Cl.
CPC .............. *A47J 31/60* (2013.01); *B08B 3/08* (2013.01)

(58) Field of Classification Search
CPC ....... A47J 31/60; B65D 11/02; B65D 17/502; C11D 11/0041
See application file for complete search history.

(56) References Cited

U.S. PATENT DOCUMENTS

| | | | |
|---|---|---|---|
| 5,173,125 A | 12/1992 | Felding | |
| 5,325,765 A | 7/1994 | Sylvan et al. | |
| 5,472,719 A | 12/1995 | Favre | |
| 5,840,189 A | 11/1998 | Sylvan et al. | |
| 6,645,537 B2 | 11/2003 | Sweeney et al. | |
| 8,216,385 B2 | 7/2012 | Dick et al. | |
| 8,382,907 B2 | 2/2013 | Dick et al. | |
| 8,573,115 B2 | 11/2013 | Lai et al. | |
| 8,646,379 B2 | 2/2014 | Lai et al. | |
| 8,950,315 B2 | 2/2015 | Lai et al. | |
| 8,978,541 B2 | 3/2015 | Lai et al. | |
| 9,066,623 B2 | 6/2015 | Lai et al. | |
| 9,155,418 B2 | 10/2015 | Lai et al. | |
| 9,486,108 B1 | 11/2016 | Douglas et al. | |
| 2005/0051478 A1 | 3/2005 | Karanikos et al. | |
| 2014/0261563 A1 | 9/2014 | Gorra et al. | |
| 2014/0345652 A1 | 11/2014 | Meng | |
| 2015/0090300 A1 | 4/2015 | Dyer | |
| 2016/0022088 A1* | 1/2016 | Dick | A47J 31/60 134/10 |

FOREIGN PATENT DOCUMENTS

| | | |
|---|---|---|
| WO | 2013166615 A1 | 11/2013 |
| WO | 2013188246 A2 | 12/2013 |

* cited by examiner

*Primary Examiner* — Gregory Webb
(74) *Attorney, Agent, or Firm* — Cantor Colburn LLP

(57) ABSTRACT

A device and method for descaling flow passages of a pod-type beverage machine is provided. The device includes a container having liquid absorbing material and dry powder vinegar contained therein. As the brewing cycle is started, water is injected into the container causing the dry powder vinegar to dissolve into a cleaning solution. At least a portion of the cleaning solution is absorbed by the liquid absorbing material, which retards the flow of the cleaning solution from out of the container. The increased retention time of the cleaning solution within the container improves the cleaning effectiveness.

12 Claims, 1 Drawing Sheet

DESCALING POD FOR BREWING MACHINE

FIELD OF THE INVENTION

A system and method for cleaning a beverage brewing machine and, more particularly, a cartridge for a beverage brewing machine containing a liquid absorbing material and powder vinegar.

BACKGROUND OF THE INVENTION

Single brew beverage machines have become a popular method of preparing drinks on demand, such as coffee, tea, hot chocolate, and other drinks. More recently, single brew beverage machines have been expanded beyond drink preparation and now are being used for preparing food items such as soup and other products that utilize hot water in their preparation.

Typically, a sealed plastic container or pod is provided. The pod is essentially a plastic cup with an open top and a foil seal closing the open top of the cup. The pod contains food or drink product, typically in dry form, and the pod may also contain a filter. For example, if the pod is a coffee pod it will contain coffee grounds and a filter basket sealed within the plastic cup by the foil seal. In order to brew the coffee, the pod is placed into a brewing machine that includes a receptacle sized and shaped to receive the pods. After the pod is placed in the receptacle, the user can initiate a brewing cycle operation of the brew machine. During the brewing process, two needles typically pierce the pod. One needle pierces the top of the pod through the foil seal to introduce hot water into the pod and the other needle pierces the bottom of the pod to provide a drainage path for the water. As the top needle introduces hot water into the pod, it interacts with the coffee grinds to brew the coffee. Filter material is suspended within the pod to provide a brew basket that allows the brewed coffee to pass quickly through the filter while preventing the coffee grounds from exiting through the bottom hole in the pod. Accordingly, a cup of coffee can be quickly and conveniently brewed. Once the brewing is complete, the pod can be removed from the machine and discarded.

There are currently several brewing machine and pod systems available on the market that have corresponding pods and receptacles of different shapes and sizes. Although these pods may vary in terms of shape, size, and construction, they all generally consist of a self-contained pod that includes a pre-portioned amount of brewing ingredients to brew a desired beverage. The pods are typically designed so that they can be punctured so that water can enter the pod, interact with the brewing ingredients to brew a beverage, and then exit the pod.

Pod brewing systems provide many advantages over traditional brewing methods, such as eliminating the need to separately purchase, measure, and add brewing ingredients (e.g., coffee grounds) to a brewing machine. The pods provide everything needed in the correct proportions to brew a desired beverage in a convenient, single use, sealed container. Moreover, once brewing is complete, the entire pod can be removed from the machine and discarded, eliminating the need to directly handle used filters and brewing ingredients.

However, one drawback of pod brewing systems is the need to clean the brewing machine itself, including cleaning and descaling the water injection needles, especially if food items are being prepared using the machine. Typically, cleaning requires purchasing separate cleaning ingredients, applying the correct amount of cleaning ingredients, and manually cleaning the needles. This presents a major inconvenience to the user, especially when one of the biggest advantages of a pod brewing system is convenience. Other methods of cleaning the brewing machine exist, such as adding cleaning solution to the water supply of the brewing machine or providing a pod that contains chemical cleaners. However, these systems are inadequate because the cleaning solution fails to reach all the parts of the brewing machine that require cleaning and/or the cleaning solution is flushed out of the system too quickly in order to effectively clean.

The present invention addresses these and other limitations associated with conventional inspection vehicles and inspection protocols.

SUMMARY OF THE INVENTION

According to an aspect of the present invention, a device for descaling flow passages of a pod-type beverage machine is provided. The device includes a container having a bottom wall and a sidewall extending from the bottom wall. The sidewall defines an open top of the container. The container is sized and shaped to be received by the beverage machine. A dry, liquid-absorbing material is disposed within the container adjacent the bottom wall. The liquid-absorbing material retards the flow of liquid therethrough and through a pierced aperture in the bottom wall when the container is put in use. Dry powder vinegar is also disposed within the container. At least a portion of the powder is disposed on a surface of the absorbing material opposite the bottom wall. A cover is provided that closes the open top of the container and seals the liquid-absorbing material and the dry powder vinegar within the container.

According to a further aspect of the present invention, the liquid absorbing material is selected from the group consisting of cotton, hemp, bamboo, lyocell, wool, sponge, cardboard, and paper fiber.

According to a further aspect of the present invention, the dry powder vinegar is selected from the group consisting of apple cider vinegar and distilled white vinegar.

According to a yet further aspect of the present invention, a further dry powder is provided, and is selected from the group consisting of citrus, lavender, vanilla, and mint extract, including various combinations thereof.

According to a further aspect of the present invention, the amount of liquid absorbing material is about 1 gram and the amount of dry powder vinegar is about 2.6 grams.

According to a further aspect of the present invention, the liquid absorbing material occupies between about one half and three quarters of the container.

According to a further aspect of the present invention, the liquid absorbing material is sized and shaped and disposed within the container such that the liquid absorbing material will come into contact with a needle of the brewing machine upon insertion into and activation of the brewing machine. According to a yet further aspect of the present invention, the needle can be a first needle that punctures the bottom wall of the container. According to a yet further aspect of the present invention, the needle can be a second needle that punctures the cover.

According to a further aspect of the present invention, the container further includes dry powder baking soda.

According to a yet further aspect of the present invention, the amount of liquid absorbing material is about 1 gram, the amount of dry powder vinegar is about 1.3 grams, and the amount of dry powder baking soda is about 1.3 grams.

According to another further aspect of the present invention, a method for descaling flow passages of a pod-type beverage machine is provided. The method includes the steps of providing a descaling pod. The descaling pod includes a container having a bottom wall and a sidewall extending from the bottom wall. The sidewall defines an open top of the container and the container is sized and shaped to be received by the beverage machine. A dry liquid absorbing material is disposed within the container adjacent the bottom wall, The liquid absorbing material is adapted to retard the flow of water therethrough. A dry powder vinegar is also disposed within the container. At least a portion of the powder is disposed on a surface of the absorbing material opposite the bottom wall. A cover closing the open top of the container is provided. The method further includes the step of inserting the descaling pod into the beverage machine. The method further includes the step of activating a brew cycle of the machine causing a first needle to pierce the cover of the pod and a second needle to pierce the bottom wall of the pod, further causing water to be injected into the pod whereupon the dry powder vinegar is dissolved into a solution with the water and at least a portion of the solution is absorbed by the liquid absorbing material. The absorption by the liquid absorbing material causes a delayed release of the solution from the liquid absorbing material.

These and other aspects, features, and advantages can be appreciated from the accompanying description of certain embodiments of the invention and the accompanying drawing figures and claims.

DETAILED DESCRIPTION CERTAIN OF EMBODIMENTS OF THE INVENTION

Figure 2:
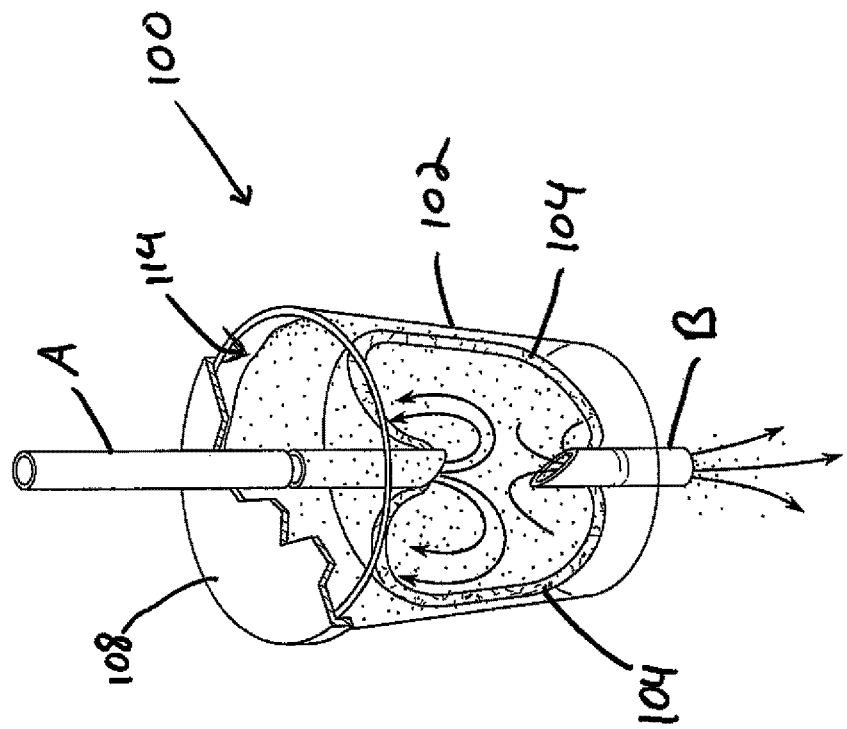
FIG. 2 illustrates the cleaning container of FIG. 1 with the outer walls shown as translucent for purposes of illustration.
Figure 1:
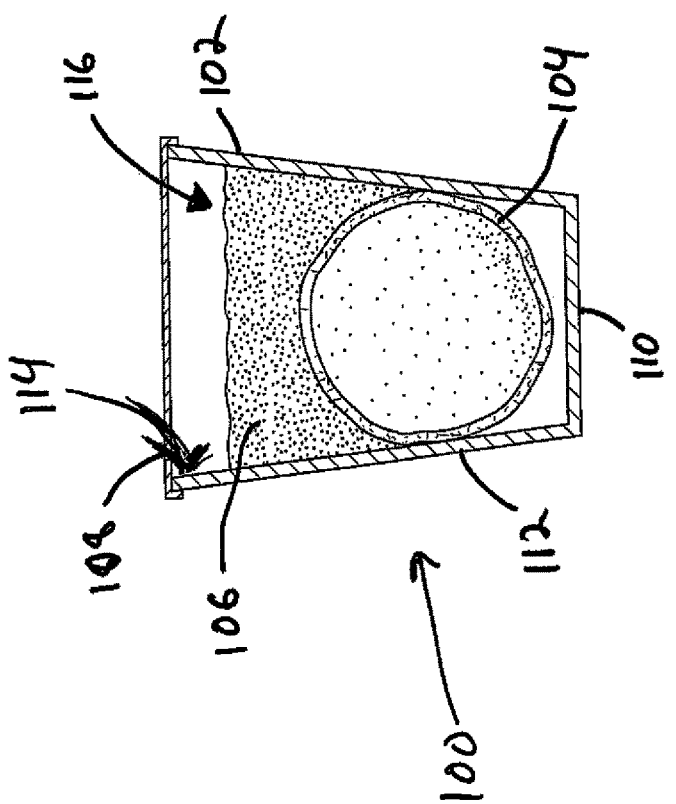
FIG. 1 illustrates cleaning container shown in cross-section in accordance with one embodiment of the present invention.

Referring to FIGS. 1 and 2, a cleaning pod 100 for a beverage brewing machine is shown. The cleaning pod 100 includes a container 102, liquid absorbing material 104, dry powder vinegar 106, and a cover 108.

The container 102 has a bottom wall 110, a sidewall 112 that extends around the periphery of the bottom wall 110, and an open top 114 defined by the sidewall 112. The container 102 is generally cup-shaped and defines an interior space 116. The walls of the container 102 can be made from a liquid impermeable material, such as plastic. Alternatively, the container walls can be made from a compressed cardboard or other paper material. Optionally, if the container walls comprise a paper-based material, the wall can further comprise a water resistant coating, such as wax, plastic, or other suitable material, to resist degradation from contact with hot water during the brewing cycle.

The liquid absorbing material 104 is disposed within the interior space 116 of the container 102. The liquid absorbing material 104 can be sized and shaped so that extends to touch the sidewalls of the container. The liquid absorbing material 104 can alternatively be sized and shaped such that it is less than the internal diameter of the container 102. The liquid absorbing material 104 is shown as being generally spherical in shape, yet other shapes are contemplated such as cylindrical, elliptical, conical, cubic, and other shapes. The liquid absorbing material 104 can be cotton, such as a cotton ball, which is fibrous and absorbs liquid. Other materials that have liquid-absorbing characteristics can be used, such as hemp, bamboo, lyocell, wool, sponge, cardboard, paper fiber, and various combinations thereof. The liquid absorbing material 104 can have a weight of about 1 gram, which describes the amount of liquid absorbing material provided in the container 102. However, more or less than 1 gram of liquid absorbing material can be provided and can vary by more or less than forty percent. As can be seen in FIG. 1, the liquid absorbing material 104 is sized and shaped to occupy about two-thirds of the volume of the container 102, and variations of between about one-half and three-quarters of the volume are also contemplated.

The pod 100 includes dry powder vinegar 106. The dry powder vinegar 106 can be apple cider vinegar, distilled white vinegar, or other food grade vinegar, including various combinations thereof. The dry powder vinegar 106 can be inserted into the container 102 after the liquid absorbing material 104 has been inserted. Accordingly, the liquid absorbing material 104 is disposed between the dry powder vinegar 106 and the bottom wall 110 of the container 102. The dry powder vinegar 106 can also be disposed within the container such that it is located below, to the side of, and/or surrounding the liquid absorbing material 104. In addition to dry powder vinegar 106, dry powder citrus, lavender, vanilla, and/or mint extracts can be included. In the arrangement shown in FIG. 1, approximately 2.6 grams of dry powder vinegar 106 is added to the container 102. The amount of dry powder vinegar 106 can vary by about plus or minus forty percent.

In certain arrangements, dry powder baking soda can also be included in the container 102 in addition to the dry powder vinegar. If dry powder baking soda is included, the powder agents in the container can consist of about 1.3 grams of vinegar and about 1.3 grams of baking soda.

A cover 108 is disposed over the open top 114 of the container 102. The cover 108 is attached to the sidewall 112 of the container 102. The cover 108 is applied after the liquid absorbing material 104 and dry powder vinegar 106 (and any other dry powder materials) have been added to the container 102. The cover 108 seals closed the open top 114 of the container 102 and prevents the items inside of the container 102 from prematurely escaping. The cover 108 is a liquid impermeable material, such thin metal foil, plastic, or other suitable materials.

Referring to FIG. 2, the pod 100 is shown in use during a brewing cycle of a brewing machine. A top needle A and a bottom needle B are shown having pierced through the cover 108 and the bottom wall 110 of the container 102, respectively. The top needle A introduces hot water into the interior 116 of the container. As the hot water enters the container 102, the dry powder vinegar 106 (and any other dry powder agents, if also included) begin to dissolve into the water to form a cleaning solution. At least a portion of the cleaning solution is then absorbed into the liquid absorbing material 104. Since the cleaning solution is absorbed into the liquid absorbing material 104, the liquid absorbing material 104 prevents all of the cleaning solution from immediately exiting the container 102 through the bottom needle B. As additional water is introduced into the container 102 via the top needle A, the liquid absorbing material 104 will become saturated. The liquid absorbing material 104 will then begin to release the cleaning solution that it absorbed over a more extended period of time. As water continues to enter the container, the cleaning solution moves about the container 102 and contacts the top and bottom needles. Moreover, in certain arrangements, the liquid absorbing material 104 can be sized and shaped and disposed within the container 102 such that the needles A and B contact the liquid absorbing material 104, thereby increasing the amount of time the needles are in contact with the cleaning solution.

Accordingly, the cleaning solution is able to clean both the top and bottom needles. The increased retention time of the cleaning solution within the container increases the contact time between the cleaning solution and the top and bottom needles. The increased contact time improves the cleaning effectiveness of the cleaning solution. The absorption of the cleaning solution by the liquid absorbing material 104 and the delayed release therefrom significantly improves the cleaning effectiveness.

The use of the liquid absorbing material 104 provides a significant improvement over cleaning devices that do not include a liquid absorbing material of the present invention. For example, a container that included only dry cleaning powder without a liquid absorbing material would empty of cleaning solution too quickly to effectively clean and descale the needles. Without a liquid absorbing material, once water is introduced into the container, all of the cleaning solution can leave the container within the first few seconds. All, or nearly all, of the cleaning solution will typically exit the container within the first ten seconds. Even containers that include a filter basket do not solve this problem because brewing filters are designed to allow liquid to pass through while retaining solids (e.g., coffee grinds). As such, the cleaning solution will pass through the filter material relatively unimpeded and, because of this, a "filter" does not satisfy the liquid absorbing property of a container configured according to the present invention.

Including a "liquid absorbing material" in a container according to the present invention causes the cleaning solution to remain within the container well in excess of ten seconds and thus qualifies as an appropriate material and quantity of material. For example, cleaning solution can remain in the container for about 25 to 30 seconds and perhaps longer. This is a significant improvement over designs that lack a liquid absorbing material, whether or not they include a filter. As discussed above, the increased retention time and slow release of the cleaning solution from the absorbing material improves the effectiveness of the cleaning of the needles. The amount, density, composition, and/or material type of the liquid absorbing material can be adjusted to achieve an optimal retention time for cleaning.

Moreover, the use of dry vinegar powder provides an advantage over designs that use either liquids or cleaning chemicals. Using dry powder vinegar as opposed to a liquid cleaner reduces the weight of the container. Accordingly, this reduces shipping costs and the environmental impact associated therewith. In addition, dry powder vinegar is a generally food safe ingredient that is not harmful if consumed. If not all of the cleaning solution is flushed from the machine during the cleaning/brewing cycle, a consumer will not be harmed if vinegar based cleaning solution residue is inadvertently consumed. In contrast, systems that use cleaning chemicals to clean the machine could cause harm to the user if accidently consumed.

The cleaning pod can be manufactured relatively easily on an assembly line, for example. A plastic container 102 can be provided. Then, the liquid absorbing material 104 can be inserted into the container 102. The dry powder vinegar 106 can then be added into the container. Alternatively, the dry powder vinegar 106 can be added before or at the same time as the liquid absorbing material. Then, the cover 108 is applied and sealed. It is also possible to add the dry powder vinegar to the liquid absorbing material itself by, for example, interspersing the powder in the fibers of the liquid absorbing material.

The pod 100 shown in FIGS. 1 and 2, is shown have a particular size, shape, construction, and orientation that corresponds to a particular brewing machine. However, there are many different brewing machines that each require pods having a different size, shape, construction, and/or orientation. Accordingly, the size, shape, construction, and/or orientation of the pod can be changed in order to function with different brewing machines without departing from the scope of the present invention.

It should be understood that various combinations, alternatives, and modifications of the present invention could be devised by those skilled in the art. The present invention is intended to embrace all such alternatives, modifications, and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

The invention claimed is:

1. An device for descaling flow passages of a pod-type beverage machine, comprising:
 a container having a bottom wall and a sidewall extending from the bottom wall, the sidewall defining an open top, the container being sized and shaped to be received by the beverage machine;
 a dry, liquid-absorbing material disposed within the container, adjacent the bottom wall, to retard the flow of liquid therethrough;
 a dry powder vinegar disposed within the container, wherein at least a portion of the powder is disposed on a surface of the absorbing material opposite the bottom wall; and
 a cover closing the open top of the container and sealing the liquid-absorbing material and the dry powder vinegar in the container.

2. The apparatus of claim 1, wherein the liquid absorbing material is selected from the group consisting of cotton, hemp, bamboo, lyocell, wool, sponge, cardboard, and paper fiber.

3. The apparatus of claim 1, wherein the dry powder vinegar is selected from the group consisting of apple cider vinegar and distilled white vinegar.

4. The apparatus of claim 1, further including dry powder selected from the group consisting of citrus, lavender, vanilla, and mint extract, including various combinations thereof.

5. The apparatus of claim 1, wherein the amount of liquid absorbing material is about 1 gram and the amount of dry powder vinegar is about 2.6 grams.

6. The apparatus of claim 1, wherein the liquid absorbing material occupies between about one half and three quarters of the container.

7. The apparatus of claim 1, wherein the liquid absorbing material is sized and shaped and disposed within the container such that the liquid absorbing material will come into contact with a needle of the brewing machine upon insertion into and activation of the brewing machine.

8. The apparatus of claim 7, wherein the needle comprises a first needle that punctures the bottom wall of the container.

9. The apparatus of claim 7, wherein the needle comprises a second needle that punctures the cover.

10. The apparatus of claim 1, further including dry powder baking soda.

11. The apparatus of claim 10, wherein the amount of liquid absorbing material is about 1 gram, the amount of dry powder vinegar is about 1.3 grams, and the amount of dry powder baking soda is about 1.3 grams.

12. A method for descaling flow passages of a pod-type beverage machine, comprising:
- providing a descaling pod, comprising:
  - a container having a bottom wall and a sidewall extending from the bottom wall, the sidewall defining an open top, the container being sized and shaped to be received by the beverage machine;
  - a dry liquid absorbing material disposed within the container adjacent the bottom wall, wherein the liquid absorbing material is adapted to retard the flow of water therethrough;
  - a dry powder vinegar disposed within the container wherein at least a portion of the powder is disposed on a surface of the absorbing material opposite the bottom wall; and
  - a cover closing the open top of the container;
- inserting the descaling pod into the beverage machine; and
- activating a brew cycle of the machine causing a first needle to pierce the cover of the pod and a second needle to pierce the bottom wall of the pod, further causing water to be injected into the pod whereupon the dry powder vinegar is dissolved into a solution with the water and at least a portion of the solution is absorbed by the liquid absorbing material causing a delayed release of the solution from the liquid absorbing material.

\* \* \* \* \*